United States Patent [19]

Miller

[11] Patent Number: 5,052,859

[45] Date of Patent: Oct. 1, 1991

[54] SEABED STABILIZATION MATTRESSES

[75] Inventor: Keith E. J. Miller, Maidenhead, United Kingdom

[73] Assignee: SeaMark Systems Limited, Broxburn, England

[21] Appl. No.: 469,497

[22] PCT Filed: Aug. 14, 1989

[86] PCT No.: PCT/GB89/00931

§ 371 Date: Apr. 17, 1990

§ 102(e) Date: Apr. 17, 1990

[87] PCT Pub. No.: WO90/01584

PCT Pub. Date: Feb. 22, 1990

[30] Foreign Application Priority Data

Aug. 12, 1988 [GB] United Kingdom ............... 8819170
Nov. 4, 1988 [GB] United Kingdom ............... 8825831
Nov. 22, 1988 [GB] United Kingdom ............... 8827240

[51] Int. Cl.[5] ............................................. E03B 7/14
[52] U.S. Cl. ................................. 405/158; 405/157
[58] Field of Search .................. 405/18, 19, 20, 157, 405/158

[56] References Cited

U.S. PATENT DOCUMENTS 4,152,875  5/1979  Soland ........................... 405/19 X
4,171,174 10/1979  Larsen ........................... 405/179 X
4,242,010 12/1980  Gjerde et al. .................... 405/157
4,334,801  6/1982  Gray ............................. 405/157
4,696,324  9/1987  Petronko .

FOREIGN PATENT DOCUMENTS 152232   8/1985  European Pat. Off. .
2039272  2/1972  Fed. Rep. of Germany ...... 405/157
2367243  5/1978  France .
7808704  2/1979  Netherlands ................... 405/157
7804372 10/1979  Netherlands ................... 405/157
669006   6/1979  U.S.S.R. ....................... 405/157
2035504  6/1980  United Kingdom .
2065205  6/1981  United Kingdom .
00108    3/1979  World Int. Prop. O. .
02054    7/1981  World Int. Prop. O. ......... 405/157
08500   11/1988  World Int. Prop. O. .

Primary Examiner—Dennis L. Taylor
Assistant Examiner—J. Russell McBee
Attorney, Agent, or Firm—Scrivener and Clarke

[57] ABSTRACT

A concrete or like articulated mattress for protection of seabed installations comprises a plurality of concrete elements (31, 32, 33, 34, 35) articulated together, the mattress having a relatively thick central block (33) from which its thickness tapers through side blocks (31, 32, 34, 35) to side edges (36, 37). In the central block (33) a tunnel (60) is provided to accomodate a seabed installation such as a pipeline to be protected. Prior to installation on a seabed, the side blocks (31, 32, 34, 35) may be folded over and stored on the top of the central block (33).

8 Claims, 4 Drawing Sheets

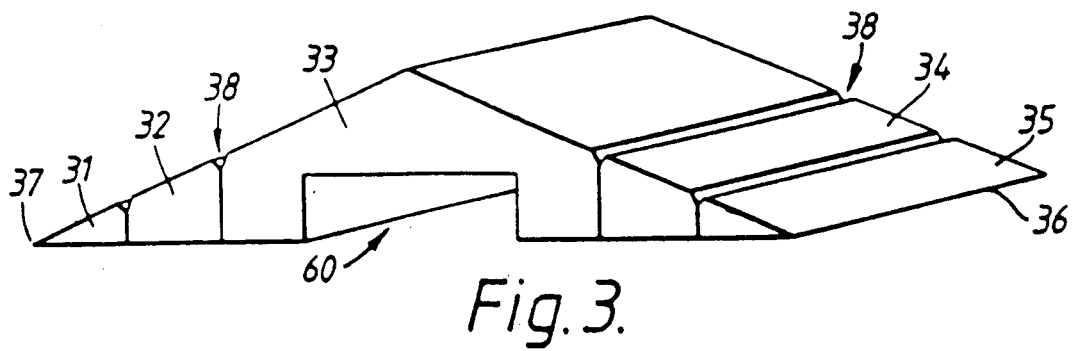
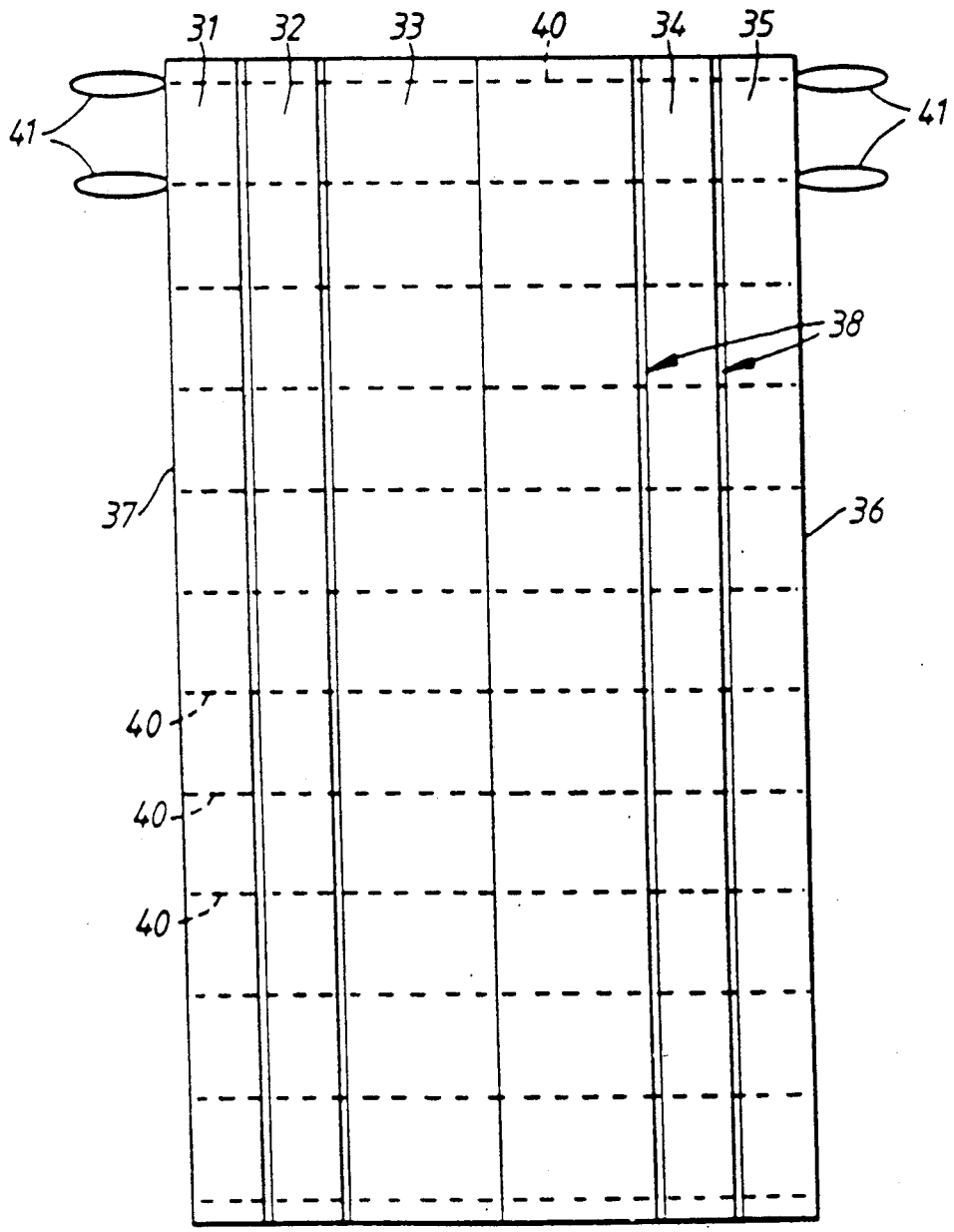

SEABED STABILIZATION MATTRESSES

BACKGROUND OF THE INVENTION

The present invention relates to articulated seabed mattresses for the protection and stabilisation of seabed installations such as pipelines.

The use of articulated mattresses in offshore coastal and marine engineering is well known for stabilisation, protection and scour prevention of pipelines, flowline umbilicals, seabed templates, steel and concrete platforms and the like. These mattresses are particularly useful in areas of high bottom current where hydrodynamic forces are considerable. Thus, for example, a seabed pipeline can be covered with such a mattress so that the pipeline is stabilised by the weight of the blanket thereon and also the adjacent seabed is protected against erosion. Examples of articulated mattresses and their use are given for example in European patent specification 152232A. Generally, these mattresses comprise concrete or similar elements joined together to allow relative articulation.

Subsea stabilisation mattresses can be relatively massive, eg. a mat of 5 m×2 m would weigh (in air) over 2.5 tons. However, even so, when they are laid over a seabed pipeline, for example, they can still be prone to movement during a storm or tidal surge. While, in theory, greater stability could be obtained by increasing the mat weight, we have found another way of dealing with this problem.

Further, in addition to stability in extreme storm conditions, a stabilisation mattress should desirably also be capable of withstanding the impact thereon of anchors or trawlboards travelling laterally, or dropped objects travelling largely vertically.

We have now devised a new design of sub-sea mattress which can provide substantial advantages in use over prior known mattresses.

In accordance with one aspect of the present invention, there is provided an articulated mattress for laying on a seabed or the like, which comprises a plurality of concrete or like members articulated together, characterised in that the mattress has a relatively thick region from which its thickness tapers to at least one side edge.

In a simple embodiment, a mattress of the invention is generally wedge-shaped. That is to say, when laid on a horizontal surface, its transverse sectional shape is roughly that of a right-angle triangle. More usually, however, mattresses of the invention will have a shape generally similar to that of a ridge tent, i.e. with a central elongate thick region tapering down on each side to a side edge of the mattress. Another possibility is to have a generally pyramidal shape, i.e. a central thick region tapering down on all sides to the edge(s). In all cases, the upper sloping surface(s) may be generally flat, or generally curved, eg. concave or convex as desired. Whilst the commonest mattress shape in plan is generally rectangular, in fact the mattresses can be of any desired plan shape as required in practice.

By providing the mattress with its own taper from a thin edge to a much thicker region, improved stability can be achieved and also improved ability to withstand lateral impact by dragged anchors or trawlboards, for example, and by dropped objects descending vertically.

The mattresses of the invention taper in thickness from a relatively thick region to at least one side edge. Normally, the tapering extends through at least two of the constituent elements of the mattress.

Conventionally, when a sea-bed pipeline or other object is to be protected, a subsea mattress is laid thereover. In accordance with a highly preferred feature of the present invention, the underside of a mattress is provided with a recessed region in which the object to be protected is received. Such a recessed region is most advantageously provided in the thick region of the mattress. This gives excellent protection to the object and also allows certain further preferred features of the invention to be adopted (described hereinafter).

The mattresses of the invention are constructed from massive elements formed from concrete or other weighty material. The concrete can be adjusted to have a low specific gravity, 1.5 t/m$_3$ for high conditions where seabed soils have little bearing strength, up to 4.7 t/m$^3$ for high current applications where additional weight is required to cope with extreme seabed currents which can be as high as 10 m/s. The mattress elements are connected by rope, hinge, geotextile or other flexible connection mechanism so that the mattress folds during deployment and the joints between the elements allow sufficient flexibility to accommodate normal seabed discontinuities.

In the mattresses of the invention, the relatively thick region will normally be made of correspondingly thick concrete (or the like) elements with gradually thinner elements being used towards the edges to give the desired taper. the outermost elements will most preferably be shaped to give protection against scour.

In a much preferred arrangement of the invention, the thick region of the mattress (which will normally be constituted by one element, although a group of two or more can be used) has on its underside a recess to receive the object to be protected, eg. part of a pipeline. Thus, such a mattress is placed over the pipeline which is received in the recessed region. This region of the pipeline is preferably encapsulated and so protected against environmental and damage loads. The pipeline need not necessarily touch the mattress at all. Thus, the thick recessed region of the mattress can straddle the pipeline without contacting it.

For certain applications where thermal expansion may be substantial and considerable movement within the recess is anticipated, or the recess is required to bear directly onto the pipeline, and when the pipeline has a special coating such as an insulating coating, the recess is preferably coated with a suitable anti-abrasion coating which could for example be a high build paint, or sheet of material such as polypropylene or polyester suitably attached to the inner surface of the recess.

At the bottom of the mattress, at the edge of any recess, there is preferably a cusp to ensure that the pipeline is retained within the recess regardless of the extent of any lateral movement. This cusp may be extended for certain applications so that it penetrates the seabed locally to enhance its ability to retain the pipeline within the recess.

The individual mattress elements can, for example, incorporate a contoured underside to increase the frictional resistance of the seabed and thereby provide additional lateral restraint.

The individual mattress elements are preferably slab-sided to ensure that adjacent matteress elements do not fold or buckle upward when a lateral force is applied. The upper surfaces of the individual elements can be contoured to reduce the hydro-dynamic lift on the elements when they lie in a lateral current flow. This flow would tend to destabilise and move the mattress in extreme water particle velocity conditions. The overall profile of the mattresses of the invention, i.e. progressive tapering from the thick region (preferably central) to the edge(s), enhances the stability of the mattress by providing a positive pressure build up on the upstream face which enhances the frictional effects which resist lateral movements and counteract the lift effects produced on the downstream face.

In recent times, it has become important to be able to pass hot materials through seabed pipelines without large heat losses. In order to achieve this, it has been necessary to use insulated pipes (which are expensive) and to locate the pipelines in trenches dug in the seabed. This is a very expensive installation and, moreover, suffers certain other disadvantages. In particular, pipelines which carry hot materials suffer substantial thermal expansion and contraction, and this has resulted in buckling of the pipelines in trenches and in damage to the pipelines themselves. We have now found, in accordance with a preferred feature of the present invention, that the mattresses of the present invention with a tunnel in their thick region, are excellent for protecting high-temperature pipelines. Use of such mattresses can obviate completely the necessity for trenches. The tunnels allow for lateral movement of the pipelines, to take up thermal dimensional changes. Also, the tunnel itself provides some small amount of thermal insulation.

In accordance with a further preferred feature of the invention, the tunnel can be filled with a heat insulant to further protect the pipeline against thermal losses. Thus, the insulation is provided to the pipeline on the seabed after the mattress has been laid on the pipeline. When a mattress of the invention is laid on a pipeline with the latter in the mattress tunnel, the space between the pipe and the mattress can be filled, or partly filled, with an insulating material. A preferred insulating material is a cementitious grout which can be flowed into the space between the pipe and the mattress, and allowed to set.

In many (but not all) cases, it is preferred to provide a flexible bag or other container for the insulation material, between the pipe and the mattress, for example to receive and contain a fluid grout in position while it cures. The container will normally be positioned in the tunnel to lie between the mattress and the pipe during installation of the mattress, and may thereafter be filled with insulant. Alternatively, and usually far less preferably, the container can sometimes be positioned after installation of the mattress.

Conveniently, the container will include at least one inlet accessible from outside the overlying mattress, for introduction of insulant into the container. A preferred form of container is a flexible bag, but other types of container can be used.

The principal function of any bags or other containers is to hold the grout or other insulant in position, especially during any curing thereof. The container is flexible to allow the insulant to conform to the shape of the pipe and so form a coating thereover. Another function of the containers can be to assist in relieving thermal stresses. Thus, as the temperature of a pipeline varies, so it expands and contracts. We have found, in accordance with a preferred feature of the invention, that by using a container of woven, rubber or another compressible material, the material itself (sandwiched between the insulation and pipeline) can absorb or reduce the effect of thermal stresses on the insulation coating. In order that the invention may be more fully understood, various embodiments thereof will now be described, by way of example only, with reference to the accompanying drawings, wherein:

BRIEF DESCRIPTION OF THE DRAWINGS

FIG. 3 is an orthogonal view of a fourth embodiment of mattress of the invention.

FIG. 4 is a top plan view of the mattress of FIG. 3.

DESCRIPTION OF THE PREFERRED EMBODIMENT

Figure 1:
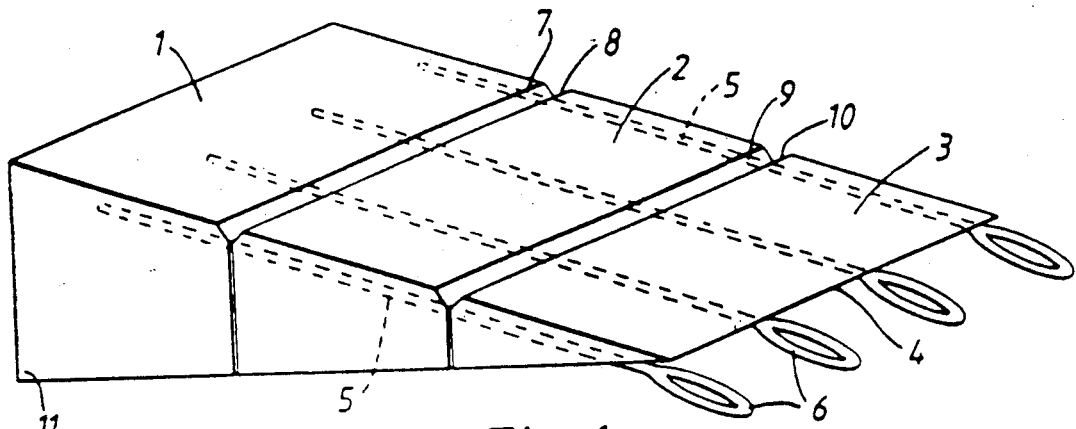
FIG. 1 is an orthogonal view of a first embodiment of mattress of the invention.

Referring to the drawings, the mattress of FIG. 1 comprises three elongate concrete members or elements 1,2 and 3, lying side-by-side. Member 1 is the thickest, and the thickness tapers down via member 2 to the side edge 4 of the member 3. (In this specification, thickness means the vertical distance from the bottom of a mattress to the top when it is lying on a flat surface.) Ropes or cables 5 are embedded in the members to link them together. At side edge 4, the ropes 5 can be formed into external loops 6 for securing the mattress, for example. The adjacent upper edges 7,8,9 and 10, of the three members 1,2 and 3, are relieved or chamfered, and the ropes 5 extend between the adjacent elements close to these edges, so that the mat can articulate. Thus, as drawn, members 2 and 3 can pivot on an axis close to their respective edges 9,10, and likewise members 1 and 2 can pivot about an axis close to their edges 7,8.

As can be seen, the end elevation of the mattress of FIG. 1 is that of a right-angled triangle with member 1 including the right-angle (11). Overall, the mattress tapers in thickness from member 1 to the side edge 4 of member 3.

Figure 1A:
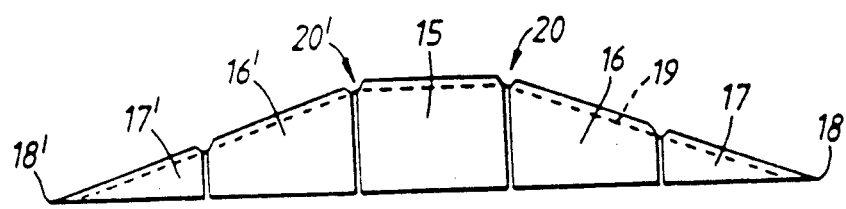
FIG. 1A is a schematic end elevation of a second embodiment of mattress of the invention.

The embodiment of FIG. 1A is a five-member mattress, comprising an elongate central thick member 15, having on each of its sides two further members 16,16' and 17,17' which respectively taper to opposed side edges 18,18'. The members are joined together with embedded ropes or cables 19 as in FIG. 1 and have relieved upper edges 20 to permit articulation.

Figure 2:
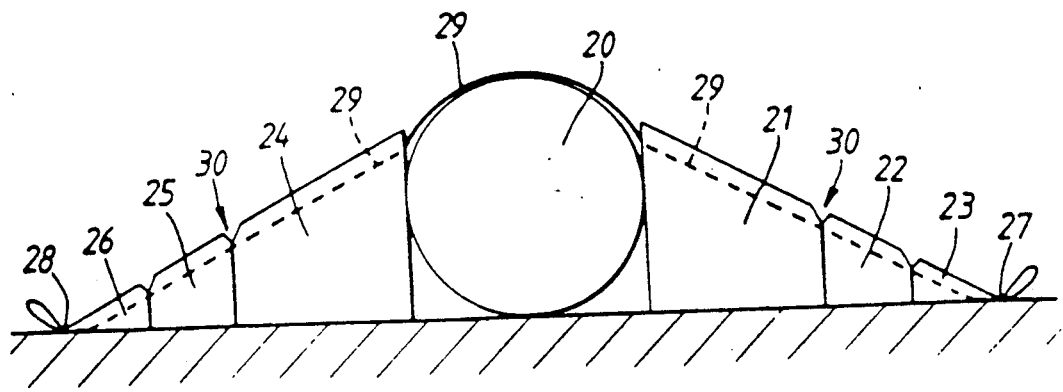
FIG. 2 is a schematic sectional view of a third embodiment of mattress of the invention laid over a seabed pipeline.

FIG. 2 shows a third embodiment of mattress of the invention, in use with a seabed pipeline 20. The mattress itself is made up essentially of two of the mattresses of FIG. 1 joined with the thickest elements adjacent. Thus, in FIG. 2, the mattress comprises three elongate concrete elements 21,22 and 23 on one side of the pipeline 20, and three similar elements 24,25 and 26 on the other side. Each group of three elements forms a wedge shape tapering from the thickest element 21,24 outwardly to the edge 27 or 28 of the outer elements 23,26. The elements 21-26 are held together by embedded ropes or the like 29 and have chamfered corners 30 to allow articulation (as in FIG. 1). The two thickest elements 21,24 are spaced apart to seat each side of pipeline 20, with the interconnecting ropes 29 straddling the pipeline 20. Thus, the height of the thickest elements 21,24 is about the same as that of pipeline 20.

FIG. 3 shows a fourth embodiment of mattress of the invention. As shown, the mattress comprises five elongate shaped concrete (or the like) elements 31-35 lying in parallel. Overall, the end elevation is generally that of an obtuse-angled triangle, the obtuse angle being at the top of central element 33. Each side of this element, the thickness of the mat tapers down to a side edge 36,37. As in FIGS. 1,1A and 2, the top edges of the elements are chamfered as at 38, to permit articulation, the elements being joined by embedded ropes.

FIG. 4 is a top plan view of the mattress of FIG. 3, and like numerals indicate like parts. The embedded ropes 40 can provide loops 41 (only four shown) at the opposed side edges 36,37 if desired. A typical size of this mattress might be width 2 m, length 5 to 6 m, and thickness ½ m.

Figure 6:
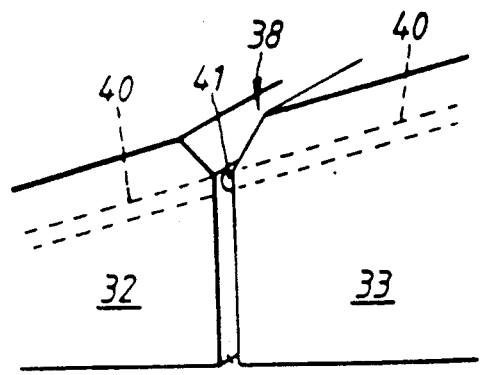
FIG. 6 is part of FIG. 5 on a larger scale to show a detail.

FIG. 6 illustrates the junction between elements 32 and 33, showing embedded rope 40 and the chamfered top edges to permit relative pivoting about the interlinking rope sections 41.

Figure 7:
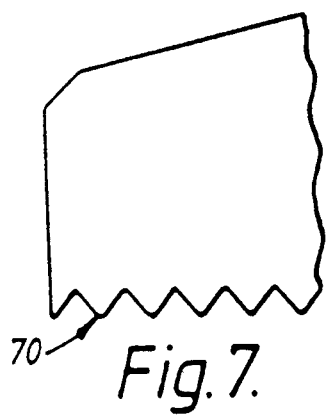
FIG. 7 schematically illustrates in section a modified element for a mattress of the invention.

FIG. 7 illustrates simply, by way of example, a concrete member such as one of those of FIG. 3, provided with a profiled base 70 to improve grip on the seabed. The normal planar base surface has been modified to increase frictional resistance against lateral movement of the mattress when placed on the seabed. Various shapes can be employed on the base for this purpose.

Figure 5:
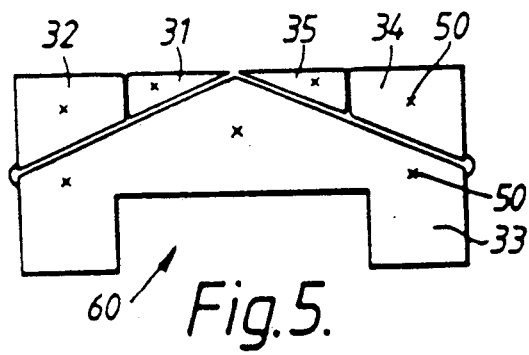
FIG. 5 shows the mattress of FIG. 3 in folded condition.

FIG. 5 shows the mattress of FIG. 3 but in a folded condition for transport. It will be observed that the outer members 31,32 have been folded back over central member 33, as have outer members 34,35, thus making a compact substantially rectangularly profiled unit which facilitates stacking for storage and transport. It is noted in this connection that, as drawn, members 31,32,34 and 35 are all of the same width equal to a quarter of the width of central member 33. However, other different relative preparations can be used. For example, if the central member is 60% of the mat width, folding will result in the apex of the member extending upwardly, but it can be received in the tunnel of another such folded mat stacked on top. FIG. 5 also shows the presence of elongate reinforcing elements 50 running longitudinally within each concrete member 31-35 to provide strengthening thereof.

Figure 8:
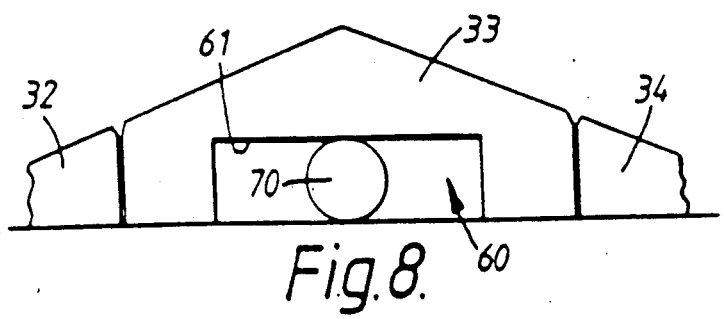
FIG. 8 illustrates the mattress of FIG. 3 laid over a seabed pipeline.

An important feature of the mattress of FIGS. 3 to 6 is the provision of a tunnel 60 in the underside of the central member 33. This tunnel extends the full length of the member and can if desired have an anti-abrasion coating (now shown) on the walls thereof. The tunnel 60 is to receive one or more seabed pipelines 70 as shown, for example, in FIG. 8. As illustrated, the outer diameter of the pipeline 70 is about the same as the height of the tunnel 60, so that the top 61 of the tunnel bears down on the pipeline 70 to positively stabilise it. The width of the tunnel 60 is greater than the diameter of the pipeline 70 to allow lateral movement of the latter as desired. It is not essential for the tunnel height ot equal the diameter of the pipeline. In can be greater so that the mattress does not bear down upon the pipeline.

Figure 9:
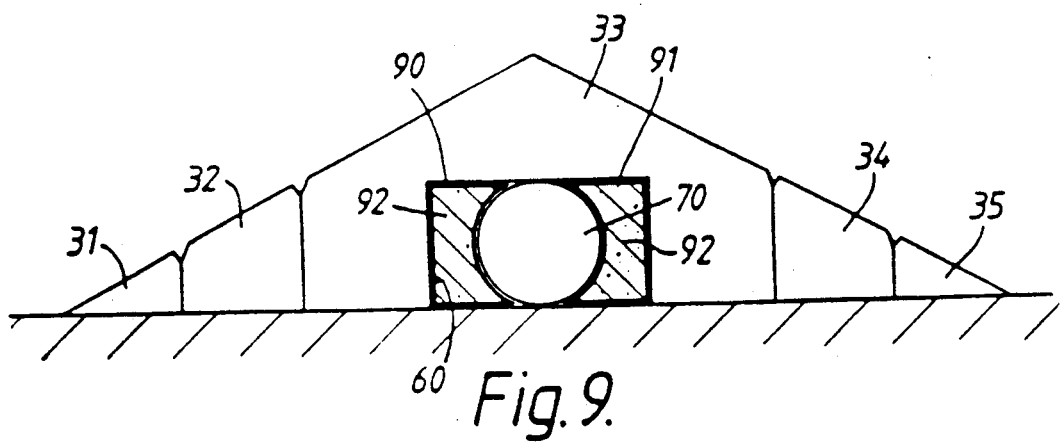
FIGS. 9-11 are schematic cross-sectional views of the general arrangement of FIG. 8 but showing the provision of insulation.
Figure 10:
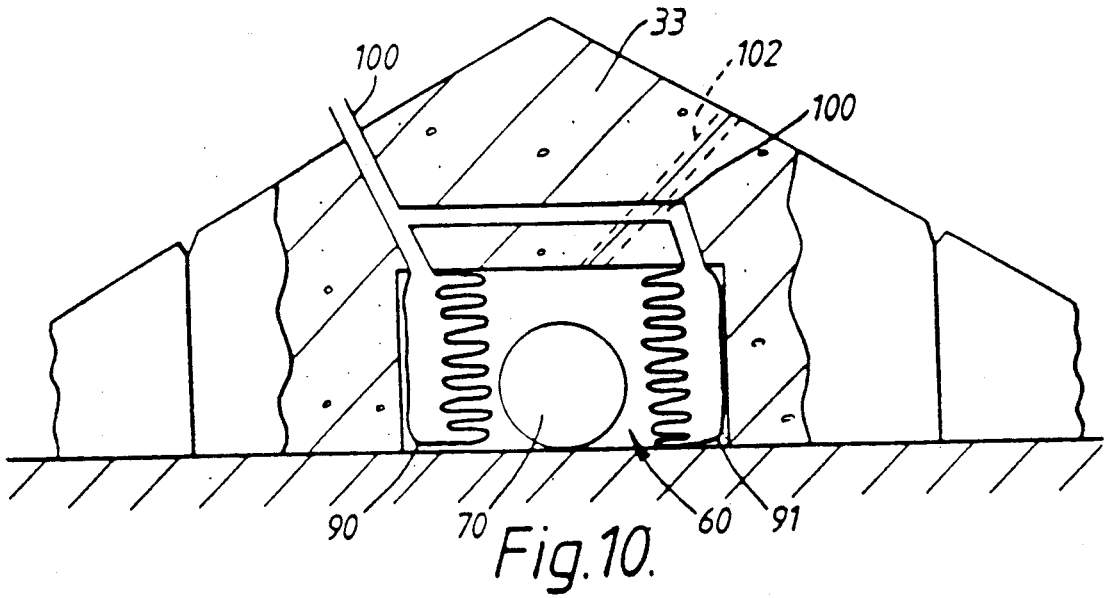
Figure 11:
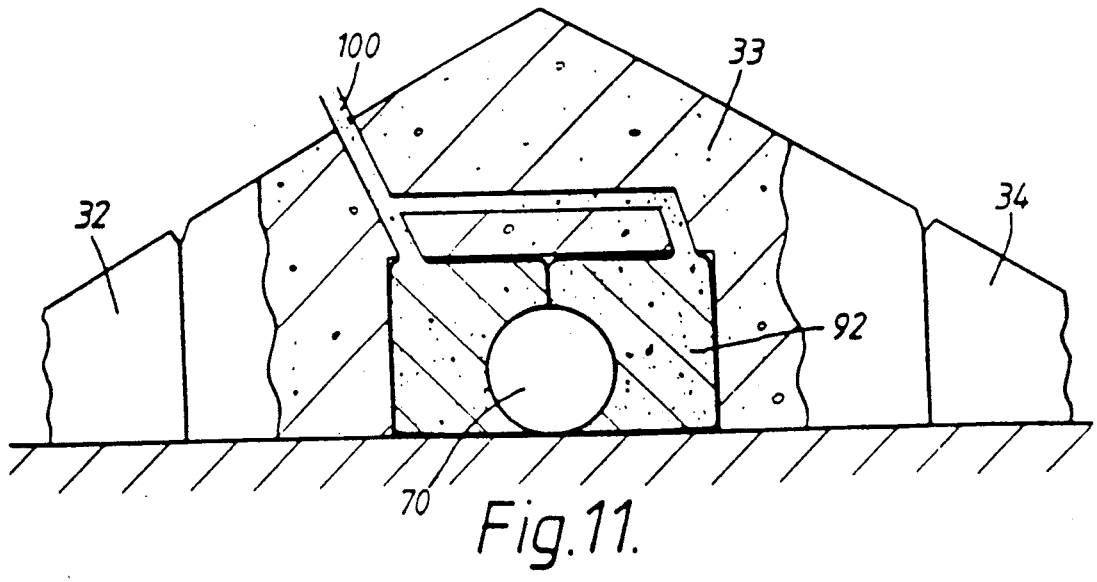

FIGS. 9 to 11 illustrate a further preferred feature of the invention, namely the provision of an insulating material in tunnel 60 of the mattress of the general type shown in FIG. 3, when in use on the seabed. FIG. 9 shows the same mattress/pipeline arrangement as in FIG. 8. However, on each side of the pipeline 70 in tunnel 60 there is provided an insulation bag 90,91 which (as shown) is filled with an insulating material 92. The insulant 92 can be a cement grout or more preferably a material which does not set hard, so still permitting some movement of the pipeline. Containment of the insulant in bags 90,91 prevents loss and confines the material around the pipeline 70 where it is needed.

FIGS. 10 and 11 illustrate one way of providing insulation material in the tunnel 60 of a mattress of the invention. These Figures illustrate the case where pipeline 70 has a diameter smaller than the height of the tunnel. As shown, the central member 33 of the mattress has one or more inlet channels 100 therein passing from the upper face 101 of the member 33 to the tunnel 60, and communicating with bags 90,91 for receiving insulant. There is one bag on each side of pipeline 70. A vent channel 102 can also be provided to allow fluid to be displaced from the tunnel 60 as the bags 90,91 are filled.

In order to provide the insulation in the tunnel, insulant material 92 is pumped through channel 100 into the bags 90,91 to expand and fill them. The bags conform to the outer surface of pipeline 70 so providing a close thermal insulation there around.

In use of the mattresses of the invention, they provide excellent stability and protection to seabed installations such as (but not only) seabed pipelines. The mattresses of the type shown in FIG. 1 can, for example, be laid on the seabed with the thickest element 1 abutting an installation. This is to provide substantial protection of the installation especially if the installation height is about the same as the height (or thickness) of element 1. This sort of use is illustrated in FIG. 2, although here there are (in effect) two mattresses of FIG. 1.

The mattress of FIGS. 3 to 6 is especially designed to be laid over a seabed installation (such as a pipeline) to provide substantial stabilisation and protection. The mattress is especially useful for pipelines carrying hot materials. Such pipelines need protection, but also must be allowed to expand and contract without damage. By locating these pipelines in a tunnel of a mattress of the invention, they are not only protected but are also permitted lateral movement (to take up thermal expansion/contraction) without damage. Furthermore, if necessary, insulation can be provided around the pipeline in the tunnel to minimise heat losses.

I claim:

1. An articulated mattress for laying on a seabed to cover a pipeline and comprising a plurality of elongate concrete members which are articulated together for lying on a seabed in side-by-side and generally parallel relation to define said mattress, said mattress including a central member comprising a unitary rigid concrete block of greater thickness than the other members and having first and second apposed side walls, an upper surface and a generally planar undersurface for engagement on the seabed, an elongate tunnel in said undersurface extending lengthwise of said central member between said side walls to receive a seabed pipeline therein, said mattress further including first and second side members having inner edges having hinged connections with the respective first and second side walls of said central member, said side members having outer edges and being thinner than said central member to provide a taper in said mattress from said central member towards said outer edges, said hinged connections being arranged that said side members can be moved from a seabed position in which they extend laterally of the central member to a storage position in which they rest wholly on said upper surface of said central member.

2. A mattress according to claim 1 wherein said mattress further includes third and fourth side members having inner edges having second hinged connections with the respective outer edges of said first and second side members, said third and fourth side members having outer edges and being thinner than said first and second side members to provide a taper in the mattress towards said outer edge of said third and fourth side members, said second hinged connection being arranged that said third and fourth side members can be moved with said first and second side members from a seabed position in which they extend laterally of the respective first and second members to a storage position in which they lie with said first and second side members wholly on said upper surface of said control member.

3. A mattress according to claim 2, which includes at least one further side member, each said further side member lying side-by-side with and generally parallel to another side member, the members being articulated together.

4. A mattress according to claim 1, wherein the width of said tunnel is greater than its depth and its depth is not less than the corresponding dimension of the pipeline so as to permit lateral movement of a seabed pipeline therein.

5. A mattress according to claim 1, wherein the width of said tunnel is no more than about half the width of said central member, and wherein the undersurface of said central member on each side of the tunnel is generally flat to sit on the surface of the seabed.

6. A mattress according to claim 1, wherein the tunnel is formed in no more than about half of the undersurface of the central member, the remainder of the undersurface providing a generally flat base to the central member for seating on the seabed.

7. A mattress according to claim 1, which further comprises means for introducing insulating material into said tunnel when the mattress has been laid on the seabed.

8. A mattress according to claim 7, wherein one or more container bags are located in said tunnel in communication with said introducing means, to receive insulating material therefrom and contain said material in said tunnnel.

* * * * *